United States Patent
Chou (10) Patent No.: US 11,099,470 B2
(45) Date of Patent: Aug. 24, 2021

(54) WAVELENGTH CONVERSION MODULE AND PROJECTION DEVICE

(71) Applicant: Coretronic Corporation, Hsin-Chu (TW)

(72) Inventor: Chih-Cheng Chou, HsinChu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/847,680

(22) Filed: Apr. 14, 2020

(65) Prior Publication Data
US 2020/0341360 A1 Oct. 29, 2020

(30) Foreign Application Priority Data
Apr. 23, 2019 (CN) .......................... 201920557555.4

(51) Int. Cl.
*G03B 21/20* (2006.01)
*H04N 9/31* (2006.01)
*G02B 26/00* (2006.01)

(52) U.S. Cl.
CPC ......... *G03B 21/204* (2013.01); *G02B 26/008* (2013.01); *G03B 21/2066* (2013.01); *H04N 9/3194* (2013.01); *H04N 9/3197* (2013.01)

(58) Field of Classification Search
CPC .... G03B 21/008; G03B 21/28; G03B 21/145; G03B 21/204; G03B 21/2013; G03B 21/2033; G03B 21/2053; G03B 21/2066; G02B 26/008; G02B 26/02; G02B 26/04; G02B 26/0833; H04N 9/3111; H04N 9/3114; H04N 9/3141; H04N 9/3152; H04N 9/3155; H04N 9/3158; H04N 9/3161; H04N 9/3194; H04N 9/3197
See application file for complete search history.

(56) References Cited

U.S. PATENT DOCUMENTS

2015/0264326 A1* 9/2015 Hayashi ............... H04N 9/3197
 348/760
2016/0025327 A1* 1/2016 Abe ....................... G03B 29/00
 348/744

(Continued)

FOREIGN PATENT DOCUMENTS

| CN | 203311071 | 11/2013 |
|---|---|---|
| CN | 105353580 | 2/2016 |
| CN | 208580292 | 3/2019 |

*Primary Examiner* — Sultan Chowdhury
(74) *Attorney, Agent, or Firm* — JCIPRNET (57) ABSTRACT

A wavelength conversion module and a projection device are provided. The wavelength conversion module includes a rotating member and a light sensing element. The rotating member includes a shaft and a positioning structure. An excitation beam forms a first spot on the rotating member. The shaft is located at the center of the rotating member. The positioning structure is located on the rotating member. The light sensing element is disposed adjacent to the rotating member for emitting a sensing beam toward a first surface of the rotating member, wherein the sensing beam forms a second spot on the rotating member. A first connecting line is formed by connecting the first spot and the shaft, a second connecting line is formed by connecting the second spot and the shaft, and an angle between the first connecting line and the second connecting line is greater than 30 degrees.

18 Claims, 9 Drawing Sheets

(56) References Cited

U.S. PATENT DOCUMENTS

2016/0170199 A1* 6/2016 Inoue .................... G03B 21/14
                                                  348/761
2018/0039168 A1* 2/2018 Suzuki ............... G03B 21/2066
2019/0018311 A1* 1/2019 Yamamoto ............. G01S 17/10

* cited by examiner

WAVELENGTH CONVERSION MODULE AND PROJECTION DEVICE

CROSS-REFERENCE TO RELATED APPLICATION

This application claims the priority benefit of China application serial no. 201920557555.4, filed on Apr. 23, 2019. The entirety of the above-mentioned patent application is hereby incorporated by reference herein and made a part of this specification.

BACKGROUND OF THE INVENTION

1. Field of the Invention

The present invention relates to an optical module and an optical device including the optical module, and in particular, to a wavelength conversion module and a projection device.

2. Description of Related Art

Recently, projection devices mainly based on solid-state light sources such as light-emitting diodes (LEDs) and laser diodes have gradually taken a place in the market. In general, excitation lights of these solid-state light sources are converted by a wavelength conversion material on a wavelength conversion wheel in a projection device to produce excited lights of different colors. These excited lights are transmitted to a light valve via a rear light path of the projection device. The light valve modulates these excited lights and thereby forms an image beam that is projected onto the outside. Therefore, the synchronous control of the wavelength conversion wheel and the light valve is very important. If the rotating period of the wavelength conversion wheel is early or delayed, the color of an image beam finally output will not be as expected.

In general, a synchronous control mechanism of the existing projection device is to paste a light-absorbing black sticker on a motor of the wavelength conversion wheel as a timing mark, and to cooperate with a light positioning device having a light emitting element and a light sensor, where the light positioning device uses the light sensor to detect the presence or absence of a light signal returned by reflection through the wavelength conversion wheel to determine the rotating period of the wavelength conversion wheel.

However, due to the power and design requirements of the light positioning device, a distance between a reflecting surface of a substrate of the wavelength conversion wheel and the light positioning device needs to be relatively short (less than about 5 mm), so the light positioning device needs to be disposed close to the substrate and motor of the wavelength conversion wheel. However, in this case, since the rotating speed of the wavelength conversion wheel is high, the temperature of a coil of the motor thereof will be higher as the rotating speed is higher, and the temperature of the substrate will rise as light conversion energy increases. In this case, the light positioning device operates at a high temperature since it is close to the substrate and motor of the wavelength conversion wheel, thereby causing a bad signal.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The present invention provides a wavelength conversion module with good reliability.

The present invention provides a projection device with good image quality.

Other objectives and advantages of the present invention may be further understood from the technical features disclosed in the present invention.

In order to achieve one, some, or all of the aforementioned objectives or other objectives, an embodiment of the present invention provides a wavelength conversion module. The wavelength conversion module is configured to receive an excitation beam, and includes a rotating member and a light sensing element. The rotating member includes a substrate, a shaft and a positioning structure. The excitation beam forms a first spot on the rotating member, wherein the shaft is located at the center of the rotating member, and the rotating member rotates with the shaft as a rotation axis. The positioning structure is located on the rotating member. The light sensing element is disposed adjacent to the rotating member for emitting a sensing beam toward a first surface of the rotating member, and the positioning structure is configured to cut into a transmission path of the sensing beam, wherein the sensing beam forms a second spot on the rotating member. A first connecting line is formed by connecting the first spot and the shaft, a second connecting line is formed by connecting the second spot and the shaft, and an angle between the first connecting line and the second connecting line is greater than 30 degrees.

In order to achieve one, some, or all of the aforementioned objectives or other objectives, an embodiment of the present invention provides a projection device. The projection device includes an illumination system, a light valve and a projection lens. The illumination system is configured to provide an illumination beam, and includes an excitation light source and the aforementioned wavelength conversion module. The excitation light source is configured to emit an excitation beam. The light valve is located on a transmission path of the illumination beam and configured to receive the illumination beam to generate an image beam. The projection lens is located on a transmission path of the image beam and configured to receive the image beam to project a projection beam.

Based on the foregoing, the embodiments of the invention have at least one of the following advantages or effects. In an embodiment of the invention, according to the wavelength conversion module and the projection device, by the configuration of the positioning structure and the light sensing element adjacent to an edge of the rotating member, the temperature of a working environment of the light sensing element can be reduced by means of a gas cutting effect during the rotation of the rotating member of the wavelength conversion module, thereby avoiding the situation of a bad signal. Moreover, since the light sensing element is disposed adjacent to the edge of the rotating member, and there is more margin between the light sensing element and an actuator for configuring other heat dissipating elements, thereby further reducing the temperature of the working environment of the wavelength conversion module and the projection device, and improving the reliability of the wavelength conversion module and the image quality of the projection device.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
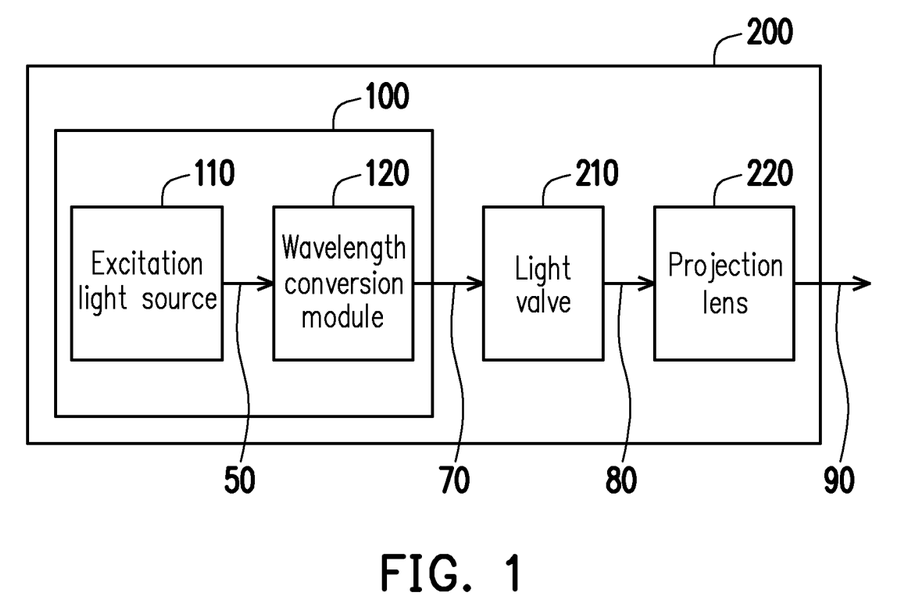
FIG. 1 schematically shows a block diagram of a projection device according to an embodiment of the present invention.
Figure 2A:
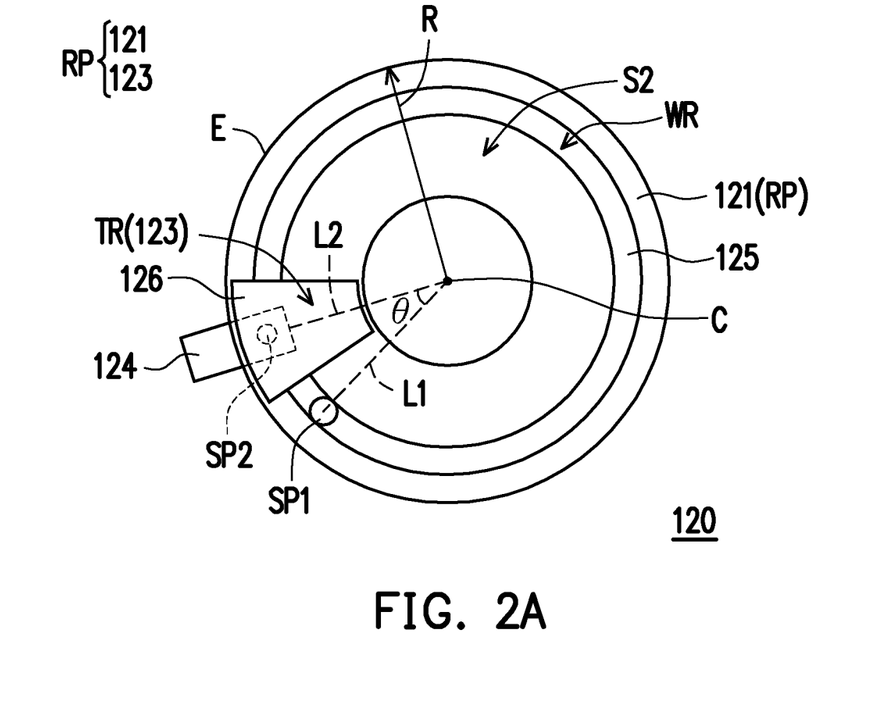
FIG. 2A schematically shows a front view of a wavelength conversion module in FIG. 1.
Figure 2B:
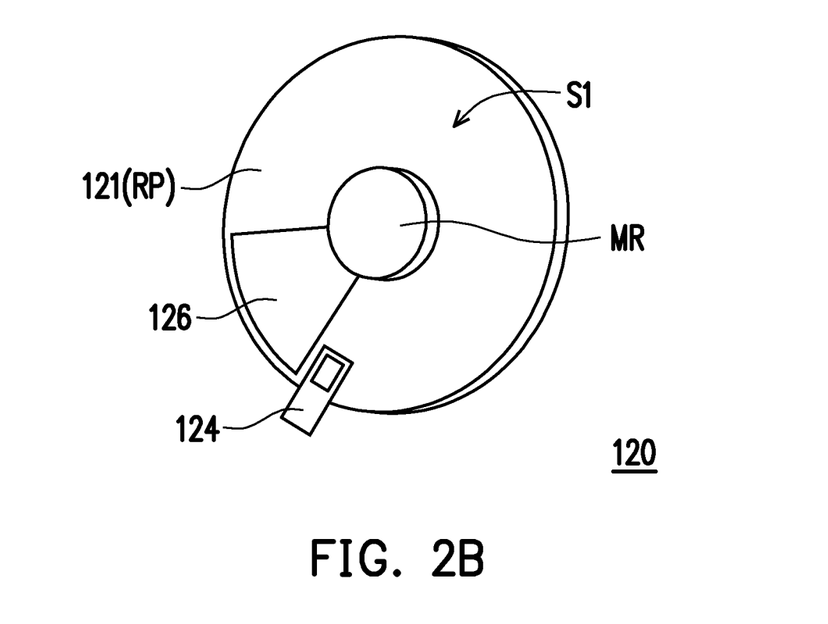
FIG. 2B schematically shows a rear view of the wavelength conversion module in FIG. 2A.
Figure 2C:
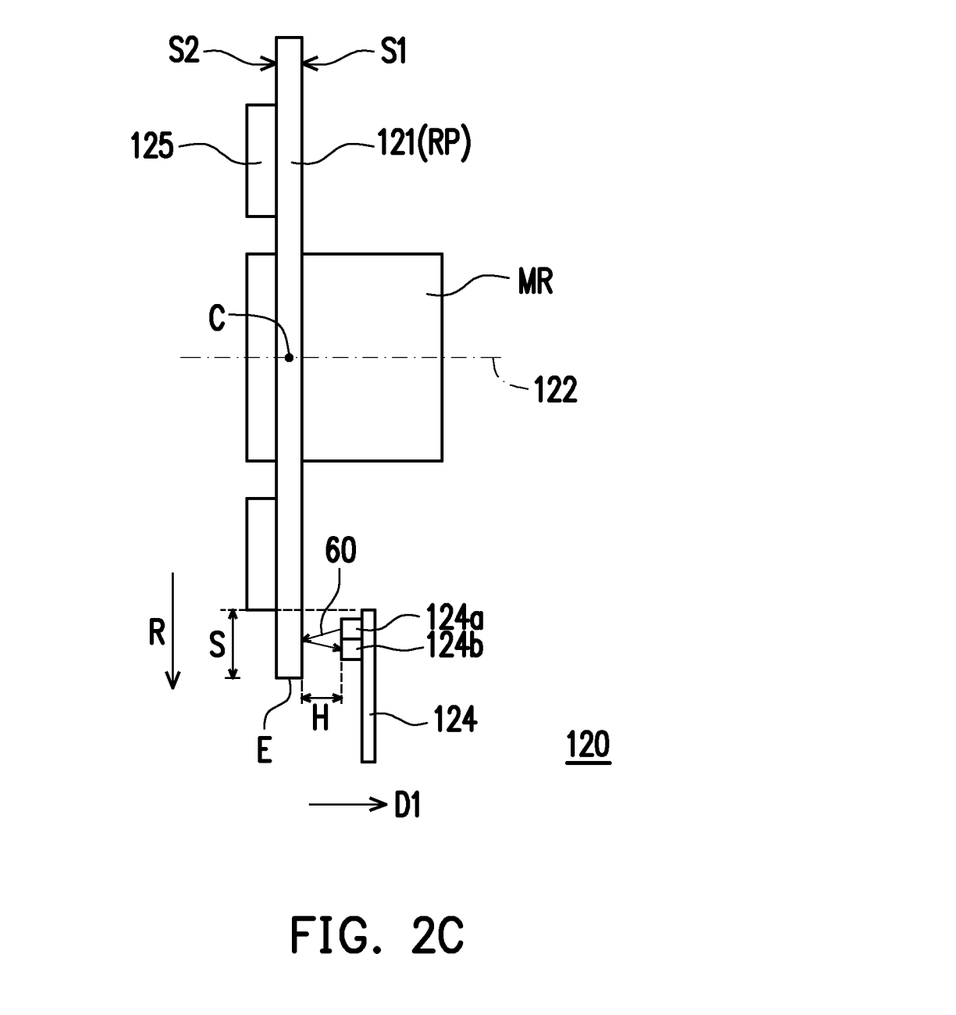
FIG. 2C schematically shows a sectional view of the wavelength conversion module in FIG. 2A when a positioning structure does not cut into a transmission path of a sensing beam.
Figure 2D:
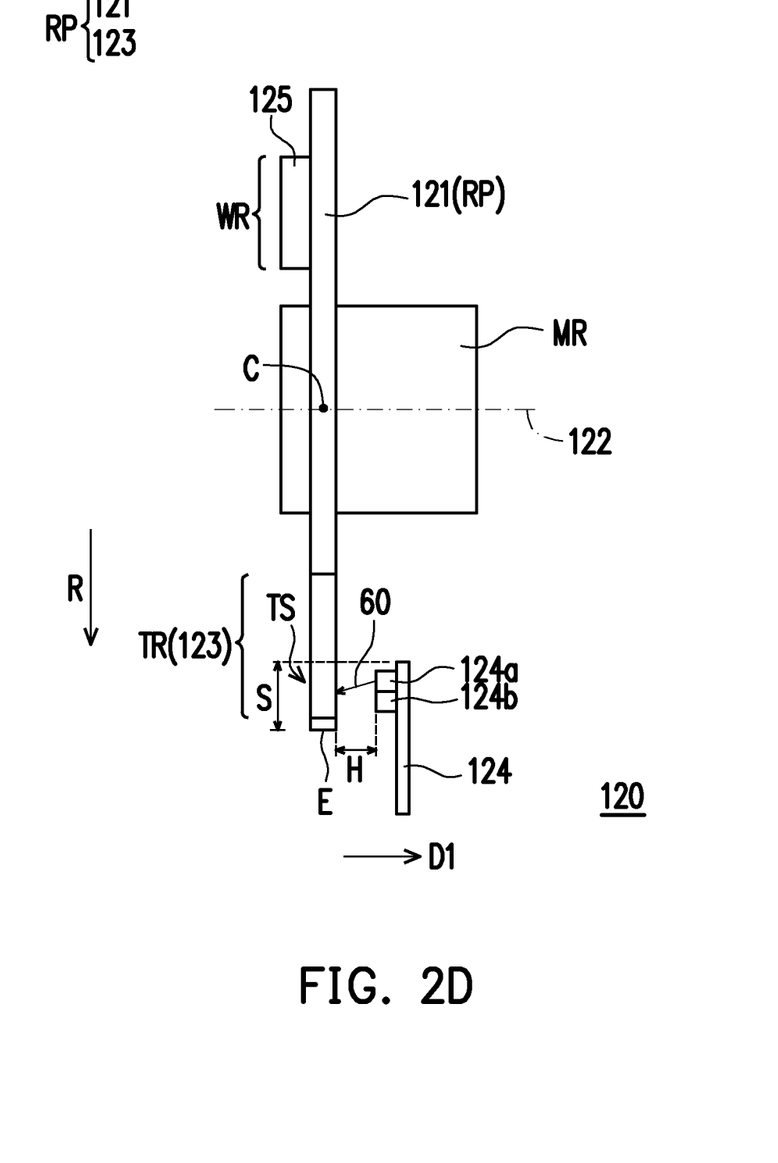
FIG. 2D schematically shows a sectional view of the wavelength conversion module in FIG. 2A when a positioning structure cuts into a transmission path of a sensing beam.
Figure 2E:
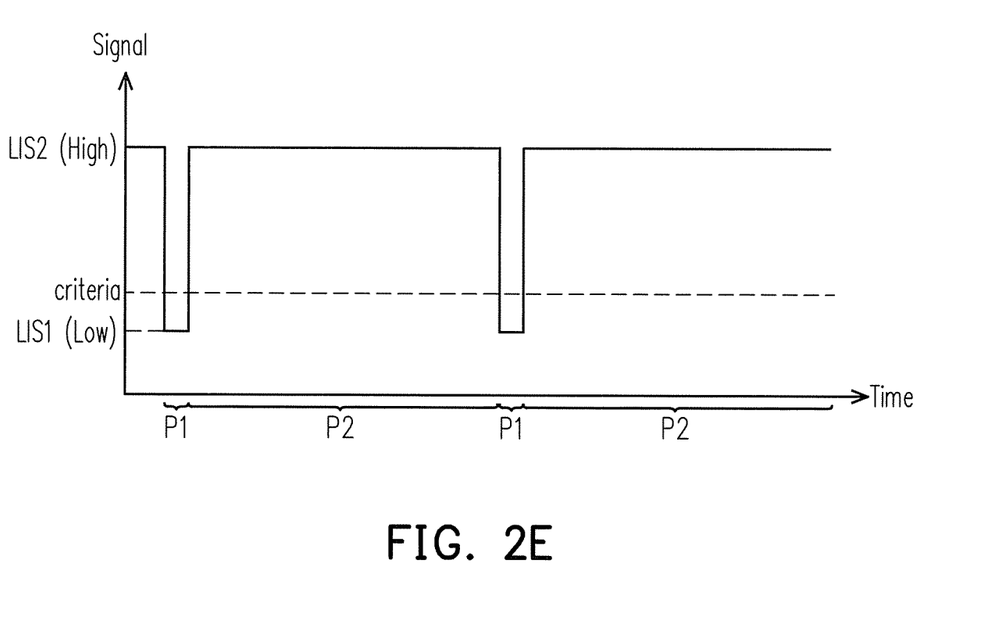
FIG. 2E is a signal intensity diagram of the first light intensity signal and the second light intensity signal of the light sensing element of FIG. 2A.

FIG. 1 schematically shows a block diagram of a projection device 200 according to an embodiment of the invention. FIG. 2A schematically shows a front view of a wavelength conversion module 120 in FIG. 1. FIG. 2B schematically shows a rear view of the wavelength conversion module 120 in FIG. 2A. FIG. 2C schematically shows a sectional view of the wavelength conversion module 120 in FIG. 2A when a positioning structure does not cut into a transmission path of a sensing beam 60. FIG. 2D schematically shows a sectional view of the wavelength conversion module 120 in FIG. 2A when a positioning structure 123 cuts into a transmission path of a sensing beam 60. Referring to FIG. 1, in the embodiment, the projection device 200 includes an illumination system 100, a light valve 210 and a projection lens 220. The illumination system 100 is configured to provide an illumination beam 70. The light valve 210 is located on a transmission path of the illumination beam 70 and configured to receive the illumination beam 70 to generate an image beam 80. The projection lens 220 is located on a transmission path of the image beam 80, and configured to receive the image beam 80 and project a projection beam 90 to a screen (not shown). For example, in the embodiment, the light valve 210 is, for example, a digital micro-mirror device (DMD) or a liquid-crystal-on-silicon (LCOS) panel. However, in other embodiments, the light valve 210 may also be a transmissive liquid crystal panel or other light modulators.

Specifically, as shown in FIG. 1, in the embodiment, the illumination system 100 includes an excitation light source 110 and a wavelength conversion module 120. The excitation light source 110 is configured to emit an excitation beam 50. For example, in the embodiment, the excitation light source 110 is a laser light source, and the excitation beam 50 is a blue laser light beam, but the invention is not limited thereto.

Further, as shown in FIG. 1 to FIG. 2D, in the embodiment, the wavelength conversion module 120 is configured to receive the excitation beam 50, and the wavelength conversion module 120 includes a rotating member RP and a light sensing element 124. The rotating member RP includes a substrate 121, a shaft C and a positioning structure 123. The rotating member RP has a first surface S1 and a second surface S2 opposite to each other, and the shaft C is located at the center of the rotating member RP. As shown in FIG. 2C to FIG. 2D, in the present embodiment, the shaft C that extends in an extending direction perpendicular to a radial direction R of the rotating member RP forms is a rotation axis 122. For example, as shown in FIG. 2A to FIG. 2D, the shaft C may be connected to an actuator MR, the actuator MR being configured to rotate the rotating member RP with the shaft C as the rotation axis 122.

On the other hand, as shown in FIG. 2A, in the embodiment, when the excitation beam 50 is incident on the wavelength conversion module 120, a first spot SP1 may be formed on the second surface S2 of the rotating member RP. As shown in FIG. 2B to FIG. 2D, the light sensing element 124 is disposed adjacent to the rotating member RP for emitting a sensing beam 60 toward the first surface S1 of the rotating member RP, and the sensing beam 60 forms a second spot SP2 on the first surface S1 of the rotating member RP. For example, in the embodiment, the substrate 121 may be, a metal substrate or a substrate made of other reflective materials, the sensing beam 60 is infrared light, and the substrate 121 may be configured to reflect the infrared light.

More specifically, as shown in FIG. 2C to FIG. 2D, in the embodiment, the light sensing element 124 includes a light emitter 124a and a light receiver 124b. The light emitter 124a is configured to emit the sensing beam 60. The light receiver 124b is configured to receive the sensing beam 60. For example, as shown in FIG. 2A to FIG. 2B, the wavelength conversion module 120 has a wavelength conversion region WR and a light passing region TR disposed adjacent to each other. When the actuator MR drives the rotating member RP to rotate with the shaft C as the rotation axis 122, the wavelength conversion region WR and the light passing region TR are alternately cut into a transmission path of the excitation beam 50. In more detail, as shown in FIG. 2C to FIG. 2D, in the embodiment, the rotating member RP further includes at least one wavelength conversion layer 125, the wavelength conversion layer 125 being disposed in the wavelength conversion region WR and located on the second surface S2 of the rotating member RP. In the embodiment, the wavelength conversion region WR (wavelength conversion layer 125) is located on the substrate 121. When the wavelength conversion region WR cuts into the transmission path of the excitation beam 50, the wavelength conversion layer 125 receives the excitation beam 50 and converts the excitation beam 50 into an excited beam (not shown), and the excited beam may be reflected at least by the substrate 121, and the wavelength of the excited beam is different from the wavelength of the excitation beam 50. On the other hand, as shown in FIG. 2B and FIG. 2D, in the embodiment, the rotating member RP further includes a light transmitting sheet 126. The substrate 121 has a hollow structure TS (as shown in FIG. 2D). The light transmitting sheet 126 is embedded in the hollow structure TS of the substrate 121 and forms a disk-shaped rotating member RP with the substrate 121. In the embodiment, the light passing region TR is located on the light transmitting sheet 126, the light transmitting sheet 126 (light passing region TR) may serve as the positioning structure 123, and when the light passing region TR respectively cuts into the transmission paths of the excitation beam 50 and the sensing beam 60, the excitation beam 50 and the sensing beam 60 may pass through the light passing region TR of the wavelength conversion module 120. In other embodiments, the light transmitting sheet 126 may also have a light diffusing function (e.g., adding diffusing particles to the light transmitting sheet).

That is, as shown in FIG. 2C to FIG. 2D, in the embodiment, the light emitter 124a and the light receiver 124b are located on the same side of the rotating member RP. When the light passing region TR does not cut into the transmission path of the sensing beam 60, the substrate 121 reflects the sensing beam 60 emitted from the light emitter 124a, and the light receiver 124b receives the sensing beam 60 reflected by the substrate 121, thus generating a stronger light intensity signal. When the light passing region TR cuts into the transmission path of the sensing beam 60, the sensing beam 60 emitted from the light emitter 124a penetrates through the light passing region TR, so that no light intensity signal is generated or a weak light intensity signal is generated. In other words, in the embodiment, since the light intensity signal received by the light receiver 124b of the light sensing element 124 is different when the light passing region TR cuts into the transmission path of the sensing beam 60, the light passing region TR may serve as the positioning structure 123 for determining the rotating period of the wavelength conversion module 120.

In more detail, as shown in FIG. 2B to FIG. 2E, in the embodiment, the light passing region TR serving as the positioning structure 123 is located on the rotating member RP, and may be configured to cut into the transmission path of the sensing beam 60. When the positioning structure 123 (i.e., the light passing region TR) cuts into the transmission path of the sensing beam 60, as interval P1 shown in FIG. 2E, the light intensity signal sensed by the light receiver 124b is a first light intensity signal LIS1. Since the sensing beam 60 penetrates through the light passing region TR, the first light intensity signal LIS1 at this time is 0 or approaches 0. When the positioning structure 123 does not cut into the transmission path of the sensing beam 60, as interval P2 shown in FIG. 2E, the light intensity signal generated by the light receiver 124b is a second light intensity signal LIS2. Since the sensing beam 60 is reflected by the substrate 121, the light receiver 124b receives the sensing beam 60 reflected by the substrate 121, and the second light intensity signal LIS2 at this time is not 0 or much greater than 0. Since the first light intensity signal LIS1 is different from the second light intensity signal LIS2, the wavelength conversion module 120 may determine whether the positioning structure 123 (i.e., light passing region TR) cuts into the transmission path of the sensing beam 60 by the change of the light intensity signal received by the light receiver 124b, and further determine the position of the positioning structure 123 (i.e., light passing region TR) with respect to the light sensing element 124.

Specifically, as shown in FIG. 2A, in the embodiment, when the positioning structure 123 cuts into the transmission path of the sensing beam 60, a first connecting line L1 is formed by connecting the first spot SP1 formed on the rotating member RP by the excitation beam 50 and the shaft C, a second connecting line L2 is formed by connecting the second spot SP2 formed on the positioning structure 123 of the rotating member RP by the sensing beam 60 and the shaft C, and an angle θ between the first connecting line L1 and the second connecting line L2 is greater than 30 degrees. In detail, when the wavelength conversion region WR cuts into the transmission path of the excitation beam 50, the excitation beam 50 forms the first spot SP1 on the wavelength conversion layer 125 of the substrate 121. When the light passing region TR cuts into the transmission path of the excitation beam 50, the excitation beam 50 incident on the light passing region TR forms the first spot SP1 on the light transmitting sheet 126. In addition, as shown in FIG. 2C to FIG. 2D, in the embodiment, a minimum distance H between the light sensing element 124 and the rotating member RP in a direction D1 parallel to the rotation axis 122 is between 0.5 mm and 0.9 mm. A distance S between a projection of the light sensing element 124 on the first surface S1 of the rotating member RP and an outermost side of an edge E of the rotating member RP in a radial direction R is less than 1 cm.

Thus, in the embodiment, according to the wavelength conversion module 120 and the projection device 200, by the configuration of the positioning structure 123 and the light sensing element 124 adjacent to the edge E of the rotating member RP, the temperature of a working environment of the light sensing element 124 can be reduced by means of a gas cutting effect during the rotation of the rotating member RP of the wavelength conversion module 120, thereby avoiding the situation of a bad signal. Moreover, in the embodiment, since the angle θ between the first connecting line L1 and the second connecting line L2 is greater than 30 degrees, the light sensing element 124 may also be away from the first spot SP1 formed on the rotating member RP by the excitation beam 50, may be away from a heat source generated by the excitation beam 50 exciting the wavelength conversion layer 125, and can be prevented from operating in an environment where an environment temperature is too high.

In addition, since the light sensing element 124 is disposed adjacent to the edge E of the rotating member RP, and there is more margin between the light sensing element 124 and the actuator MR for configuring other heat dissipating elements, thereby further reducing the temperature of the working environment of the wavelength conversion module 120 and the projection device 200, and improving the reliability of the wavelength conversion module 120 and the image quality of the projection device 200.

In the foregoing embodiment, the positioning structure 123 is exemplified by the light passing region TR of the wavelength conversion module 120, but the invention is not limited thereto. In other embodiments, the positioning structure 123 may also be other structures. Some examples are given below as an illustration.

Figure 3A:
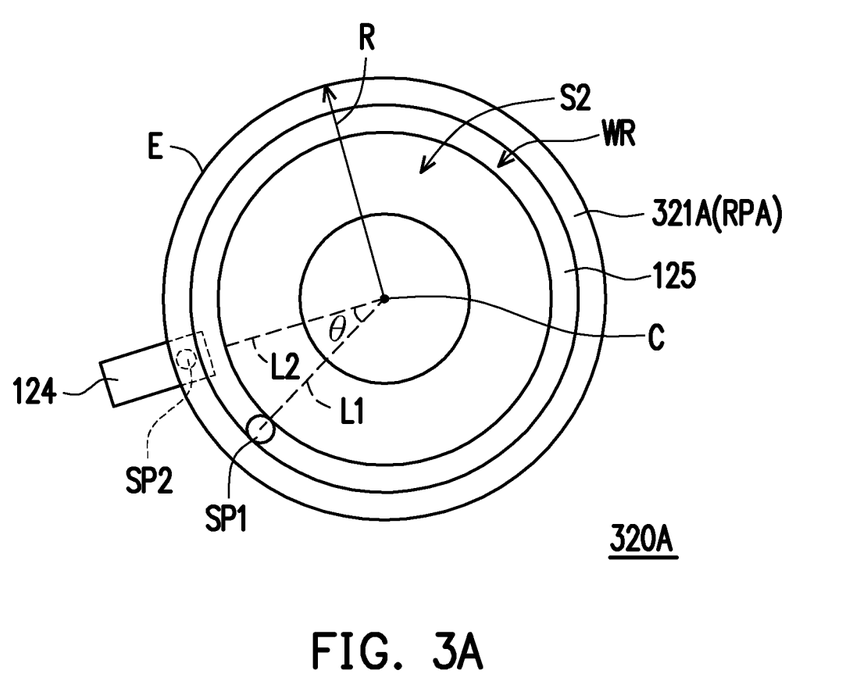
FIG. 3A schematically shows a front view of another wavelength conversion module in FIG. 1.
Figure 3B:
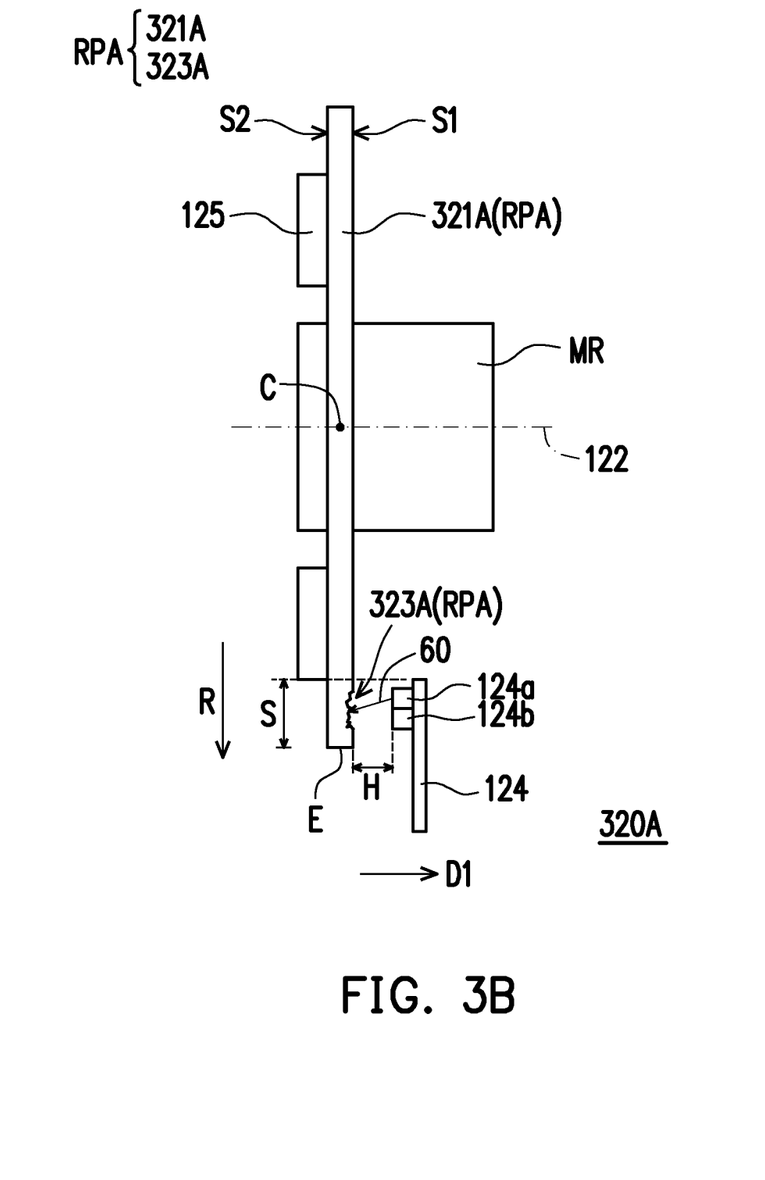
FIG. 3B schematically shows a sectional view of the wavelength conversion module in FIG. 3A when a positioning structure cuts into a transmission path of a sensing beam.

FIG. 3A schematically shows a front view of another wavelength conversion module 320A in FIG. 1. FIG. 3B schematically shows a sectional view of the wavelength conversion module 320A in FIG. 3A when a positioning structure 323A cuts into a transmission path of a sensing beam 60. The wavelength conversion module 320A in FIG. 3A to FIG. 3B is similar to the wavelength conversion module 120 in FIG. 2A to FIG. 2D, with the differences as described below. As shown in FIG. 3A, a rotating member RPA is not provided with the light transmitting sheet 126 as shown in FIG. 2A to FIG. 2B; that is, there is no light passing region. A substrate 321A of the wavelength conversion module 320A does not have a hollow structure TS; that is, the substrate 321A is a complete circular substrate. The wavelength conversion layer 125 of the rotating member RPA is also configured in a complete ring shape. Accordingly, as shown in FIG. 3B, in the embodiment, when a positioning structure 323A of the rotating member RPA may form another structure on the first surface S1 of the rotating member RPA, such that when the positioning structure 323A cuts into the transmission path of the sensing beam 60, the light intensity signal received by the light receiver 124b changes accordingly, thereby performing positioning.

Further, as shown in FIG. 3B, in the embodiment, the positioning structure 323A is located on the first surface S1 of the rotating member RPA and may be a roughened surface for scattering the sensing beam 60. As shown in FIG. 3B, when the positioning structure 323A cuts into the transmission path of the sensing beam 60, the first light intensity signal LIS1 thereof is also very small since the sensing beam 60 is scattered by the positioning structure 323A (roughened surface), even if the light receiver 124b at this time receives part of the scattered sensing beam 60. On the other hand, when the positioning structure 323A does not cut into the transmission path of the sensing beam 60, the sensing beam 60 may be reflected by the substrate 321A. Therefore, the light receiver 124b may receive the sensing beam 60 reflected by the substrate 321A, and the second light intensity signal LIS2 at this time is stronger than the first light intensity signal LIS1. Since the first light intensity signal LIS1 is different from the second light intensity signal LIS2, it may be determined whether the positioning structure 323A cuts into the transmission path of the sensing beam 60 by the change of the light intensity signal received by the light receiver 124b, and the position of the positioning structure 323A with respect to the light sensing element 124 may be further determined.

Thus, in the embodiment, according to the wavelength conversion module 320A and the projection device 200, by the configuration of the positioning structure 323A and the light sensing element 124 adjacent to the edge E of the rotating member RPA, the temperature of a working environment of the light sensing element 124 can be reduced by means of a gas cutting effect during the rotation of the rotating member RPA of the wavelength conversion module 320A, thereby avoiding the situation of a bad signal. Moreover, in the embodiment, since the angle θ between the first connecting line L1 and the second connecting line L2 is also greater than 30 degrees, the light sensing element 124 may also be away from the first spot SP1 formed on the rotating member RPA by the excitation beam 50, may be away from a heat source generated by the excitation beam 50 exciting the wavelength conversion layer 125, and can be prevented from operating in an environment where an environment temperature is too high.

In addition, since the light sensing element 124 is also disposed adjacent to the edge E of the rotating member RPA, and there is more margin between the light sensing element 124 and the actuator MR for configuring other heat dissipating elements. Therefore, when the wavelength conversion module 320A is applied to the foregoing projection device 200, the temperature of the working environment of the wavelength conversion module 320A and the projection device 200 can be further reduced, and the reliability of the wavelength conversion module 320A and the image quality of the projection device 200 can be improved.

Figure 3C:
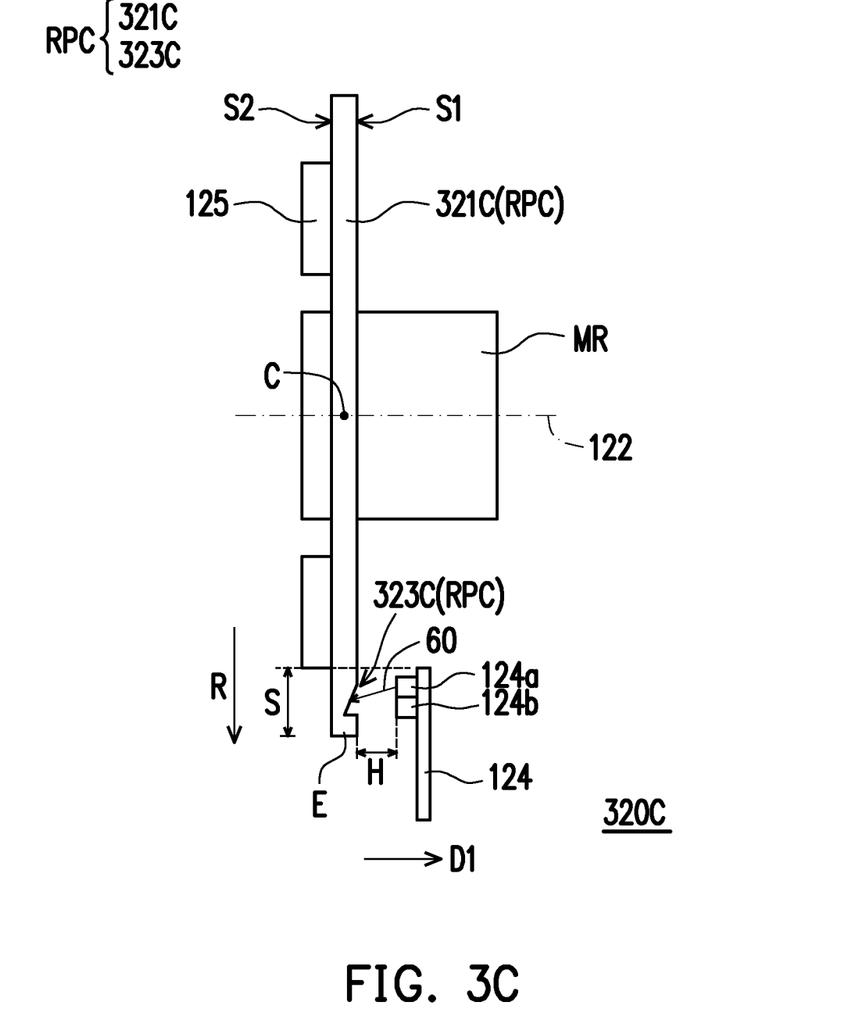
FIG. 3C schematically shows a sectional view of the wavelength conversion module in FIG. 3A when another positioning structure cuts into a transmission path of a sensing beam.

FIG. 3C schematically shows a sectional view of the wavelength conversion module 320C in FIG. 3A when another positioning structure 323C cuts into a transmission path of a sensing beam 60. The positioning structure 323C of the wavelength conversion module 320C in FIG. 3C is similar to the positioning structure 323A of the wavelength conversion module 320A in FIG. 3B, with the differences as described below. As shown in FIG. 3C, in the embodiment, the positioning structure 323C is located on the first surface S1 of a rotating member RPC and is an inclined plane. The inclined plane is inclined with respect to the first surface S1. The sensing beam 60 is reflected to other positions by the inclined plane (the positioning structure 323C) and is prevented from being transmitted to the light receiver 124b. As shown in FIG. 3C, when the positioning structure 323C cuts into the transmission path of the sensing beam 60, the first light intensity signal LIS1 received by the light receiver 124b at this time is very small since the sensing beam 60 is reflected by the positioning structure 323C (the inclined plane) and deviates from the position of the light receiver 124b. On the other hand, when the positioning structure 323C does not cut into the transmission path of the sensing beam 60, the sensing beam 60 may be reflected by a substrate 321C. Therefore, the light receiver 124*b* may receive the sensing beam 60 reflected by the substrate 321C, and the second light intensity signal LIS2 at this time is stronger than the first light intensity signal LIS1. Since the first light intensity signal LIS1 is different from the second light intensity signal LIS2, it may be determined whether the positioning structure 323C cuts into the transmission path of the sensing beam 60 by the change of the light intensity signal received by the light receiver 124*b*, and the position of the positioning structure 323C with respect to the light sensing element 124 may be further determined.

Thus, in the embodiment, since the wavelength conversion module 320C has a similar positioning structure as the wavelength conversion module 320A in FIG. 3B, a similar positioning function can be achieved by the configuration of the positioning structure 323C, so the wavelength conversion module 320C can achieve similar effects and advantages as the wavelength conversion module 320A in FIG. 3B, which will not be described herein. Moreover, when the wavelength conversion module 320C is applied to the foregoing projection device 200, the projection device 200 can also achieve similar effects and advantages, which will not be described herein.

Figure 3D:
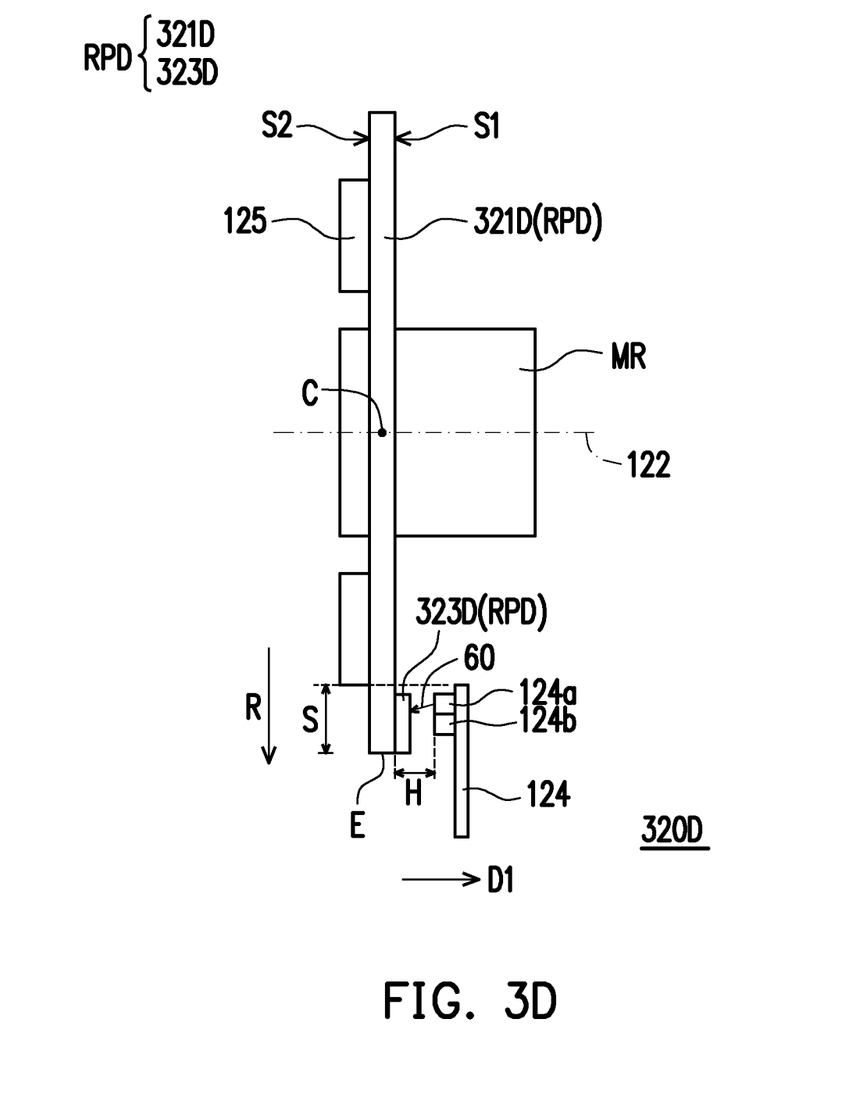
FIG. 3D schematically shows a sectional view of the wavelength conversion module in FIG. 3A when still another positioning structure cuts into a transmission path of a sensing beam.

FIG. 3D schematically shows a sectional view of the wavelength conversion module 320D in FIG. 3A when still another positioning structure 323D cuts into a transmission path of a sensing beam 60. The positioning structure 323D of the wavelength conversion module 320D in FIG. 3D is similar to the positioning structure 323A of the wavelength conversion module 320A in FIG. 3B, with the differences as described below. As shown in FIG. 3D, in the embodiment, the positioning structure 323D is located on the first surface S1 of a rotating member RPD and is a light absorbing layer for absorbing the sensing beam 60. As shown in FIG. 3D, when the positioning structure 323D cuts into the transmission path of the sensing beam 60, the first light intensity signal LIS1 received by the light receiver 124*b* at this time is very small since the sensing beam 60 is absorbed by the positioning structure 323D (light absorbing layer). On the other hand, when the positioning structure 323D does not cut into the transmission path of the sensing beam 60, the sensing beam 60 may be reflected by a substrate 321D. Therefore, the light receiver 124*b* may receive the sensing beam 60 reflected by the substrate 321D, and the second light intensity signal LIS2 at this time is stronger than the first light intensity signal LIS1. Since the first light intensity signal LIS1 is different from the second light intensity signal LIS2, it may be determined whether the positioning structure 323D cuts into the transmission path of the sensing beam 60 by the change of the light intensity signal received by the light receiver 124*b*, and the position of the positioning structure 323D with respect to the light sensing element 124 may be further determined.

Thus, in the embodiment, since the wavelength conversion module 320D has a similar positioning structure as the wavelength conversion module 320A in FIG. 3B, a similar positioning function can be achieved by the configuration of the positioning structure 323D, so the wavelength conversion module 320D can achieve similar effects and advantages as the wavelength conversion module 320A in FIG. 3B, which will not be described herein. Moreover, when the wavelength conversion module 320D is applied to the foregoing projection device 200, the projection device 200 can also achieve similar effects and advantages, which will not be described herein.

In summary, the embodiments of the invention have at least one of the following advantages or effects. In an embodiment of the invention, according to the wavelength conversion module and the projection device, by the configuration of the positioning structure and the light sensing element adjacent to an edge of the rotating member, the temperature of a working environment of the light sensing element can be reduced by means of a gas cutting effect during the rotation of the rotating member of the wavelength conversion module, thereby avoiding the situation of a bad signal. Moreover, in the embodiment, since the angle between the first connecting line and the second connecting line is greater than 30 degrees, the light sensing element may also be away from the first spot formed on the rotating member by the excitation beam, may be away from a heat source generated by the excitation beam exciting the wavelength conversion layer, and can be prevented from operating in an environment where an environment temperature is too high. In addition, since the light sensing element is disposed adjacent to the edge of the rotating member, and there is more margin between the light sensing element and an actuator for configuring other heat dissipating elements, thereby further reducing the temperature of the working environment of the wavelength conversion module and the projection device, and improving the reliability of the wavelength conversion module and the image quality of the projection device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wavelength conversion module, for receiving an excitation beam, comprising:
   a rotating member, comprising a substrate, a shaft and a positioning structure, wherein the excitation beam forms a first spot on the rotating member, the shaft is located at the center of the rotating member, the rotating member rotates with the shaft as a rotation axis, and the positioning structure is located on the rotating member; and
   a light sensing element, disposed adjacent to the rotating member for emitting a sensing beam toward a first surface of the rotating member, wherein the positioning structure is configured to cut into a transmission path of the sensing beam, the sensing beam forms a second spot on the rotating member, a first connecting line is formed by connecting the first spot and the shaft, a second connecting line is formed by connecting the second spot and the shaft, and an angle between the first connecting line and the second connecting line is greater than 30 degrees,
   wherein the light sensing element comprises a light emitter for emitting the sensing beam and a light receiver for receiving the sensing beam, when the positioning structure cuts into the transmission path of the sensing beam, the light receiver generates a first light intensity signal, and when the positioning structure does not cut into the transmission path of the sensing beam, the light receiver generates a second light intensity signal, and the first light intensity signal is different from the second light intensity signal.

2. The wavelength conversion module according to claim 1, wherein the light emitter and the light receiver are located on the same side of the rotating member, when the positioning structure does not cut into the transmission path of the sensing beam, the substrate reflects the sensing beam, and the light receiver receives the sensing beam reflected by the substrate.

3. The wavelength conversion module according to claim 1, wherein the positioning structure is located on the first surface of the rotating member and is a roughened surface for scattering the sensing beam.

4. The wavelength conversion module according to claim 1, wherein the positioning structure is located on the first surface of the rotating member and is an inclined plane, and the sensing beam is prevented from being transmitted to the light receiver by the inclined plane.

5. The wavelength conversion module according to claim 1, wherein the positioning structure is a light passing region, and the sensing beam penetrates through the light passing region when the light passing region cuts into the transmission path of the sensing beam.

6. The wavelength conversion module according to claim 1, wherein a minimum distance between the light sensing element and the rotating member in a direction parallel to the rotation axis is between 0.5 mm and 0.9 mm.

7. The wavelength conversion module according to claim 1, wherein a radial distance between a projection of the light sensing element on the first surface of the rotating member and an edge of the rotating member is smaller than 1 cm.

8. The wavelength conversion module according to claim 1, wherein the sensing beam is infrared light, and the substrate is configured to reflect the infrared light.

9. A projection device, comprising:
   an illumination system, configured to provide an illumination beam, and comprising:
      an excitation light source, configured to emit an excitation beam;
      a wavelength conversion module, configured to receive the excitation beam, and comprising:
         a rotating member, comprising a substrate, a shaft and a positioning structure, wherein the excitation beam forms a first spot on the rotating member, the shaft is located at the center of the rotating member, the rotating member rotates with the shaft as a rotation axis, and the positioning structure is located on the rotating member;
         a light sensing element, disposed adjacent to the rotating member for emitting a sensing beam toward a first surface of the substrate, wherein the positioning structure is configured to cut into a transmission path of the sensing beam, the sensing beam forms a second spot on the rotating member, a first connecting line is formed by connecting the first spot and the shaft, a second connecting line is formed by connecting the second spot and the shaft, and an angle between the first connecting line and the second connecting line is greater than 30 degrees;
   a light valve, located on a transmission path of the illumination beam and configured to receive the illumination beam to generate an image beam; and
   a projection lens, located on a transmission path of the image beam and configured to receive the image beam to project a projection beam,
   wherein the light sensing element comprises a light emitter for emitting the sensing beam and a light receiver for receiving the sensing beam, when the positioning structure cuts into the transmission path of the sensing beam, the light receiver generates a first light intensity signal, and when the positioning structure does not cut into the transmission path of the sensing beam, the light receiver generates a second light intensity signal, and the first light intensity signal is different from the second light intensity signal.

10. The projection device according to claim 9, wherein the light emitter and the light receiver are located on the same side of the rotating member, when the positioning structure does not cut into the transmission path of the sensing beam, the substrate reflects the sensing beam, and the light receiver receives the sensing beam reflected by the substrate.

11. The projection device according to claim 9, wherein the positioning structure is located on the first surface of the rotating member and is a roughened surface for scattering the sensing beam.

12. The projection device according to claim 9, wherein the positioning structure is located on the first surface of the rotating member and is an inclined plane, and the sensing beam is prevented from being transmitted to the light receiver by the inclined plane.

13. The projection device according to claim 9, wherein the positioning structure is a light passing region, and the sensing beam penetrates through the light passing region when the light passing region cuts into the transmission path of the sensing beam.

14. The projection device according to claim 9, wherein a minimum distance between the light sensing element and the rotating member in a direction parallel to the rotation axis is between 0.5 mm and 0.9 mm.

15. The projection device according to claim 9, wherein a radial distance between a projection of the light sensing element on the first surface of the rotating member and an edge of the rotating member is smaller than 1 cm.

16. The projection device according to claim 9, wherein the sensing beam is infrared light, and the substrate is configured to reflect the infrared light.

17. A wavelength conversion module, for receiving an excitation beam, comprising:

a rotating member, comprising a substrate, a shaft and a positioning structure, wherein the excitation beam forms a first spot on the rotating member, the shaft is located at the center of the rotating member, the rotating member rotates with the shaft as a rotation axis, and the positioning structure is located on the rotating member; and a light sensing element, disposed adjacent to the rotating member for emitting a sensing beam toward a first surface of the rotating member, wherein the positioning structure is configured to cut into a transmission path of the sensing beam, the sensing beam forms a second spot on the rotating member, a first connecting line is formed by connecting the first spot and the shaft, a second connecting line is formed by connecting the second spot and the shaft, and an angle between the first connecting line and the second connecting line is greater than 30 degrees, wherein a radial distance between a projection of the light sensing element on the first surface of the rotating member and an edge of the substrate of the rotating member is smaller than 1 cm.

18. A projection device, comprising:

an illumination system, configured to provide an illumination beam, and comprising:

an excitation light source, configured to emit an excitation beam;

a wavelength conversion module, configured to receive the excitation beam, and comprising:

a rotating member, comprising a substrate, a shaft and a positioning structure, wherein the excitation beam forms a first spot on the rotating member, the shaft is located at the center of the rotating member, the rotating member rotates with the shaft as a rotation axis, and the positioning structure is located on the rotating member;

a light sensing element, disposed adjacent to the rotating member for emitting a sensing beam toward a first surface of the substrate, wherein the positioning structure is configured to cut into a transmission path of the sensing beam, the sensing beam forms a second spot on the rotating member, a first connecting line is formed by connecting the first spot and the shaft, a second connecting line is formed by connecting the second spot and the shaft, and an angle between the first connecting line and the second connecting line is greater than 30 degrees;

a light valve, located on a transmission path of the illumination beam and configured to receive the illumination beam to generate an image beam; and a projection lens, located on a transmission path of the image beam and configured to receive the image beam to project a projection beam, wherein a radial distance between a projection of the light sensing element on the first surface of the rotating member and an edge of the substrate of the rotating member is smaller than 1 cm.

* * * * *